US009826066B2

(12) United States Patent
Ramaiah et al.

(10) Patent No.: US 9,826,066 B2
(45) Date of Patent: Nov. 21, 2017

(54) SYSTEM FOR DYNAMIC SELECTION AND APPLICATION OF TCP CONGESTION AVOIDANCE FLAVORS

(71) Applicant: Citrix Systems, Inc., Fort Lauderdale, FL (US)

(72) Inventors: Chaitra Maraliga Ramaiah, Karnataka (IN); Praveen Raja Dhanabalan, Tamil Nadu (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 165 days.

(21) Appl. No.: 14/632,729

(22) Filed: Feb. 26, 2015

(65) Prior Publication Data

US 2016/0255004 A1 Sep. 1, 2016

(51) Int. Cl.
*H04L 1/00* (2006.01)
*H04L 29/06* (2006.01)

(52) U.S. Cl.
CPC .................................... *H04L 69/16* (2013.01)

(58) Field of Classification Search
CPC ....... H04L 47/12; H04L 47/41; H04L 47/283; H04L 69/16
See application file for complete search history.

(56) References Cited

U.S. PATENT DOCUMENTS 8,214,707 B2 * 7/2012 Munson ................ H04L 1/0002 370/394
2002/0150048 A1 * 10/2002 Ha ........................ H04L 1/1887 370/231
2008/0144503 A1 * 6/2008 Persson ................... H04L 47/10 370/235
2008/0144504 A1 * 6/2008 Marcondes ........... H04L 47/125 370/235
2008/0144511 A1 * 6/2008 Marcondes ............. H04L 45/00 370/236
2008/0144663 A1 * 6/2008 Johnson ................. G06N 7/005 370/469
2009/0113048 A1 * 4/2009 Maze ...................... H04L 47/10 709/224
2009/0279429 A1 * 11/2009 Griffoul ............ H04L 29/08846 370/230
2009/0316581 A1 * 12/2009 Kashyap ................. H04L 45/28 370/236
2010/0246398 A1 * 9/2010 Chiang ............... H04L 43/0829 370/235
2011/0249553 A1 * 10/2011 Wang ...................... H04L 47/27 370/230
2012/0106342 A1 5/2012 Sundararajan et al.

(Continued)

*Primary Examiner* — Clemence Han

(74) *Attorney, Agent, or Firm* — Foley & Lardner LLP; Christopher J. McKenna

(57) ABSTRACT

A system for optimizing network traffic is described. The system includes a packet engine configured to acquire data regarding a flow of a plurality of data packets over a link and to determine transport communication protocol (TCP) characteristics for the flow, and a TCP flavor selector configured to dynamically select a TCP flavor based on the TCP characteristics, where the TCP flavor can be used to modify the flow of data packets over the link. The TCP characteristics dynamically change with time. The TCP flavor selector is further configured to modify the flow using the TCP flavor.

23 Claims, 9 Drawing Sheets

(56) References Cited

U.S. PATENT DOCUMENTS

| | | | | |
|---|---|---|---|---|
| 2013/0163428 | A1* | 6/2013 | Lee | H04W 28/0289 370/235 |
| 2013/0223254 | A1* | 8/2013 | Oguchi | H04L 47/283 370/252 |
| 2013/0297743 | A1* | 11/2013 | Eschet | H04L 65/60 709/219 |
| 2014/0189074 | A1 | 7/2014 | Parker | |
| 2014/0289383 | A1* | 9/2014 | Draznin | H04L 67/141 709/222 |
| 2015/0036500 | A1* | 2/2015 | Williams | H04L 47/193 370/235 |
| 2015/0043339 | A1* | 2/2015 | Wang | H04L 43/0864 370/230 |
| 2015/0117208 | A1* | 4/2015 | Radulescu | H04L 43/10 370/235 |
| 2015/0188830 | A1* | 7/2015 | Zhao | H04L 47/27 370/235 |
| 2016/0255009 | A1 | 9/2016 | Ramaiah et al. | |

* cited by examiner

700

| Static Input 410 | | Dynamic Input 420 | | | | Output: TCP flavor 440 |
|---|---|---|---|---|---|---|
| *Link Type* 412 | *Bandwidth* 413 | *Packet loss rate* | *Average Delay* | *Average Queuing Delay* | *Is ($cwnd_{total}$ >$BDP_{avg}$)* | |
| | | | | | | |
| Leased | High | Low | High | Low | No | TCP flavor A |
| Leased | High | Medium | High | Low | Yes | TCP flavor B |
| Broadband | High | High | High | High | N/A | TCP flavor C |
| .... | | | | | | |

FIG. 7

SYSTEM FOR DYNAMIC SELECTION AND APPLICATION OF TCP CONGESTION AVOIDANCE FLAVORS

BACKGROUND

A middlebox is a network appliance that manipulates internet traffic by optimizing data flow across the network. Middleboxes may be configured as wide area network ("WAN") optimizers and may be deployed in pairs across two geographically separated locations to optimize data traffic between the two middleboxes. Middleboxes may be connected through a single link or multiple links such as a leased line link and a broadband link.

Middleboxes, such as WAN optimizers, use TCP congestion avoidance algorithms, commonly called "TCP flavors," to optimize TCP data flows as part of a quality of service ("QoS") scheme. TCP flavors improve quality of service across TCP connections by avoiding packet loss and connection failure due to TCP traffic congestion.

Common examples of TCP avoidance flavors include algorithms such as TCP Vegas, TCP Reno, TCP NewReno, TCP Hybla, TCP BIC, and TCP CUBIC, among others. Each TCP congestion avoidance flavor is suited for optimizing data flows originating from or received by particular operating systems, link types, and/or other network characteristics. For example, "Compound TCP," the default TCP flavor in a recent Microsoft™ Windows™ operating system uses queuing delay and packet loss as the feedback signal. "CUBIC TCP," the default TCP flavor in many Linux™-based systems uses packet loss as the feedback signal. But a single TCP flavor may not suit multiple data flow conditions, which can dynamically change with time based on data flow considerations like packet round trip time (RTT), total packet loss, etc. For example, a link using "TCP flavor A" may be suited for the flow conditions on a static (dedicated/proxied) link shared between two middlebox appliances. Over time the same link can become heavily loaded and congested, and "TCP flavor A" may become a poor choice for the current TCP characteristics. Instead, "TCP flavor B" may be optimal to minimize packet loss, and maximize packet throughput and round trip times. Conventional middlebox appliances, however, cannot select and apply TCP flavors to an uninterrupted data stream based on dynamically changing network traffic characteristics.

Moreover, some middlebox appliances can host multiple links of the same type, or a combination of different media ports on the same device, such as broadband links, leased line links, wireless links, etc. A particular congestion avoidance flavor may work optimally with a particular link type and/or with a particular range of bandwidths, but be less than optimal with other link types and bandwidths as traffic conditions change over time.

SUMMARY

In one aspect, a system for optimizing network traffic is described, comprising a packet engine configured to acquire data regarding a flow of a plurality of data packets over a link and to determine TCP characteristics for the flow. The system can include a TCP flavor selector configured to dynamically select a TCP flavor based on the TCP characteristics. The TCP flavor can be used to adjust and/or modify the flow of data packets over the link.

In another aspect, a method for optimizing network traffic is described. The method can include acquiring data regarding a flow of a plurality of data packets over a link, determining TCP characteristics for the flow, and selecting a TCP flavor based on the TCP characteristics. The TCP flavor can be used to modify the flow of data packets over the link.

In yet another aspect, a non-transitory computer readable storage medium is described. The medium stores a set of instructions that are executable by at least one processor of an appliance that cause the appliance to perform a method for optimizing network traffic. The method can include acquiring TCP characteristics, and dynamically selecting a TCP flavor based on the TCP characteristics. The TCP flavor can be used to modify the flow of data packets over the link.

BRIEF DESCRIPTION OF THE DRAWINGS

Reference will now be made to the accompanying drawings showing example embodiments of this disclosure. In the drawings:

FIG. 7 is a chart representing an exemplary configuration of an apparatus, consistent with embodiments of the present disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide TCP network quality control by dynamically selecting and applying TCP congestion avoidance flavors to TCP data flows. The TCP congestion avoidance flavor selection embodiments can avoid or mitigate network congestion and improve the efficiency of the network through data flow optimization.

Figure 1:
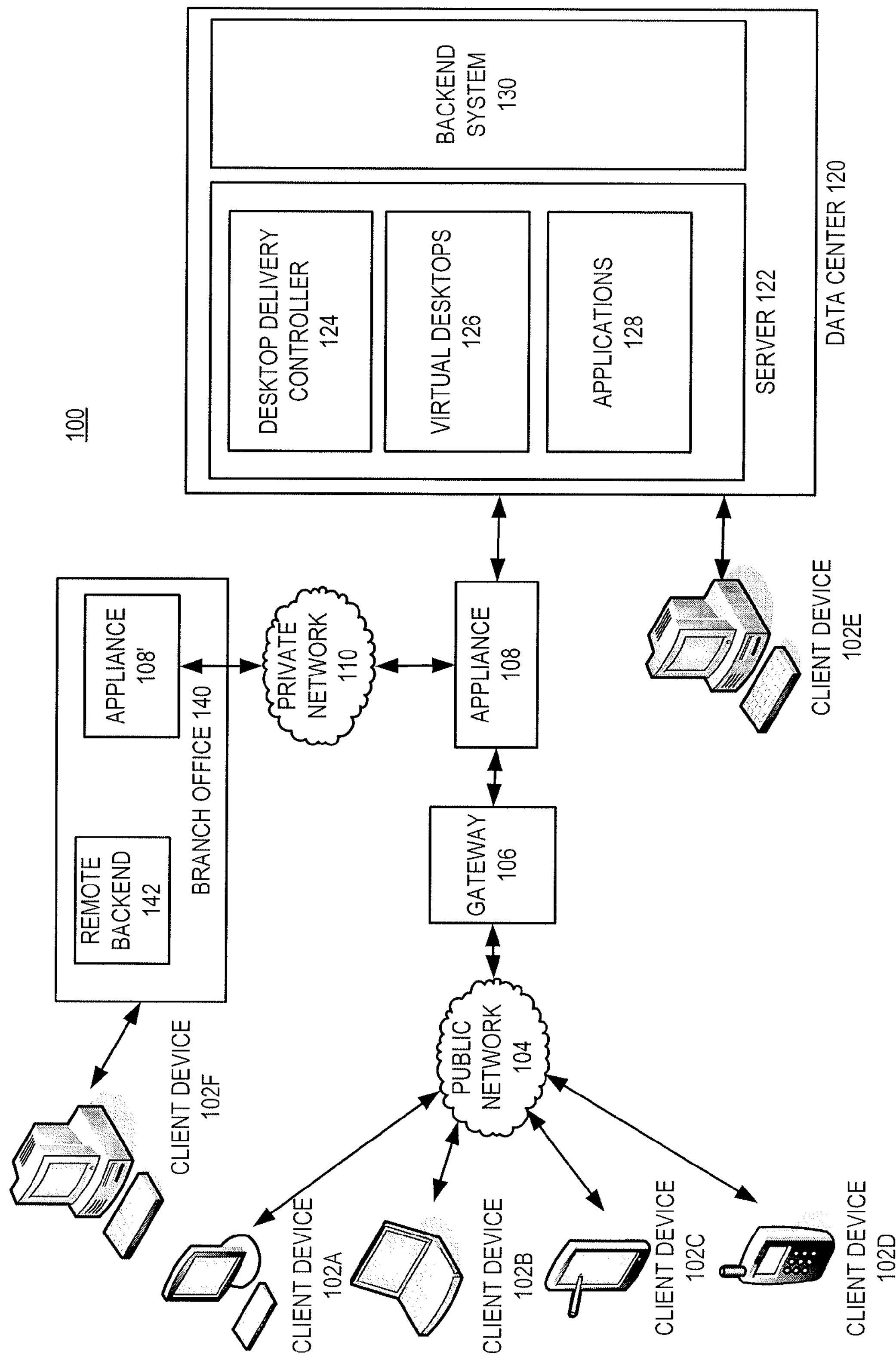
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102, a public network 104, a gateway 106, an appliance 108, a private network 110, a data center 120, and a branch office 140.

One or more client devices 102 are devices that acquire remote services from data center 120 through various means. Client devices 102 can communicate with a data center 120 either directly (e.g., client device 102*e*) or indirectly through a public network 104 (e.g., client devices 102*a-d*) or a private network 110 (e.g., client device 102*f*). When client device 102 communicates through public network 104 or private network 110, a communication link is established. For example, a link can be established by public network 104, gateway 106, and appliance 108, thereby providing a client device (e.g. client devices 102*a-d*) access to data center 120. A link can also be established by branch office 140 including appliance 108'', private network 110, and appliance 108, thereby providing a client device (e.g. client device 102*f*) access to data center 120. While client devices 102 are portrayed as a computer (e.g., client devices 102*a*, 102*e*, and 102*f*), a laptop (e.g., client device 102*b*), a tablet (e.g., client device 102*c*), and a mobile smart phone (e.g., client device 102*d*), it is appreciated that client device 102 could be any type of device (e.g., wearable or smart watch) that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network or a wireless network.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway has the ability to modify signals received from client device 102 into signals that appliance 108 and/or data center 120 can understand and vice versa.

Appliance 108 is a device that optimizes wide area network (WAN) traffic by including, for example, a quality of service ("QoS") engine. In some embodiments, appliance 108 optimizes other types of network traffic, such as local area network (LAN) traffic, metropolitan area network (MAN) traffic, or wireless network traffic. Appliance 108 can optimize network traffic by, for example, scheduling data packets in an established communication link so that the data packets can be transmitted or dropped at a scheduled time and rate. In some embodiments, appliance 108 is a physical device, such as Citrix System's ByteMobile™, Netscaler™, or CloudBridge™. In some embodiments, appliance 108 can be a virtual appliance. In some embodiments, appliance can be a physical device having multiple instances of virtual machines (e.g., virtual Branch Repeater). In some embodiments, a first appliance (e.g., appliance 108) works in conjunction with or cooperation with a second appliance (e.g., appliance 108') to optimize network traffic. For example, the first appliance can be located between the WAN and a corporate LAN (e.g., data center 120), while the second appliance can be located between a branch office (e.g., branch office 140) and a WAN connection. In some embodiments, the functionality of gateway 106 and appliance 108 can be located in a single physical device. Appliances 108 and 108' can be functionally the same or similar. Moreover, in some embodiments, appliance 108 and gateway 106 can be part of the same device. Appliance 108 is further described below corresponding to FIG. 3A.

Data center 120 is a central repository, either physical or virtual, for the storage, management, and dissemination of data and information pertaining to a particular public or private entity. Data center 120 can be used to house computer systems and associated components, such as one or physical servers, virtual servers, and storage systems. Data center 120 can include, among other things, one or more servers (e.g., server 122) and a backend system 130. In some embodiments data center 120 can include gateway 106, appliance 108, or a combination of both.

Server 122 is an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 102*a-f* or branch office 140). For example, applications 128 can include Microsoft Windows™-based applications and computing resources.

Desktop delivery controller 124 is a device that enables delivery of services, such as virtual desktops 126 to client devices (e.g., client devices 102*a-f* or branch office 140). Desktop delivery controller 124 provides functionality required to manage, maintain, and optimize all virtual desktop communications.

In some embodiments, the services include providing one or more virtual desktops 126 that can provide one or more applications 128. Virtual desktops 126 can include hosted shared desktops allowing multiple user to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with server 122. For example, backend system 130 can include Microsoft Active Directory™, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle™ backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network (LAN) that is part of the WLAN having data center 120. Branch office 140 can include, among other things, appliance 108' and remote backend 142. In some embodiments, appliance 108' can sit between branch office 140 and private network 110. As stated above, appliance 108' can work with appliance 108. Remote backend 142 can be set up in similar manner as backend system 130 of data center 120. Client device 102*f* can be located on-site to branch office 140 or can be located remotely from branch office 140.

Appliances 108 and 108' and gateway 106 can be deployed as or executed on any type and form of specific computing device (e.g., such as the computing device of FIGS. 2A-2B) capable of communicating on any type and form of network described herein. Appliances 108 and 108' can be deployed individually or as a pair operatively connected together.

Figure 2A:
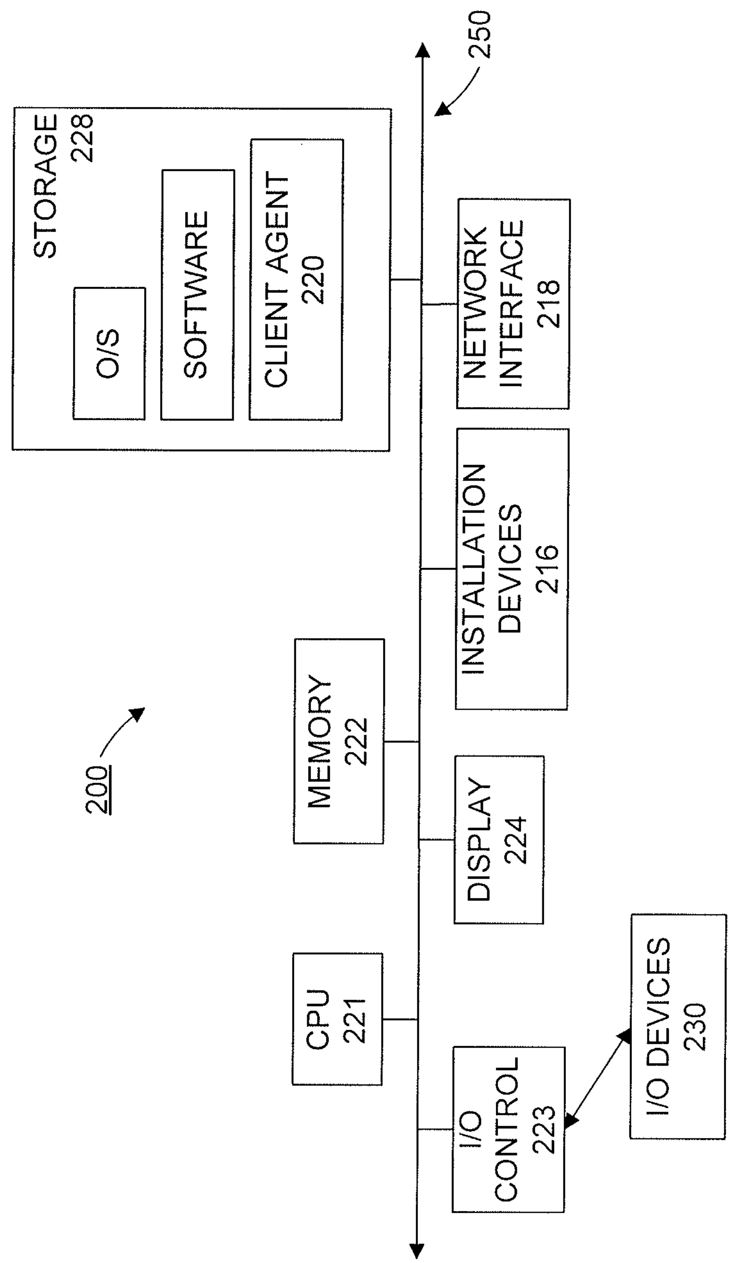
FIGS. 2A-2B are block diagrams of an exemplary computing device, consistent with embodiments of the present disclosure.
Figure 2B:
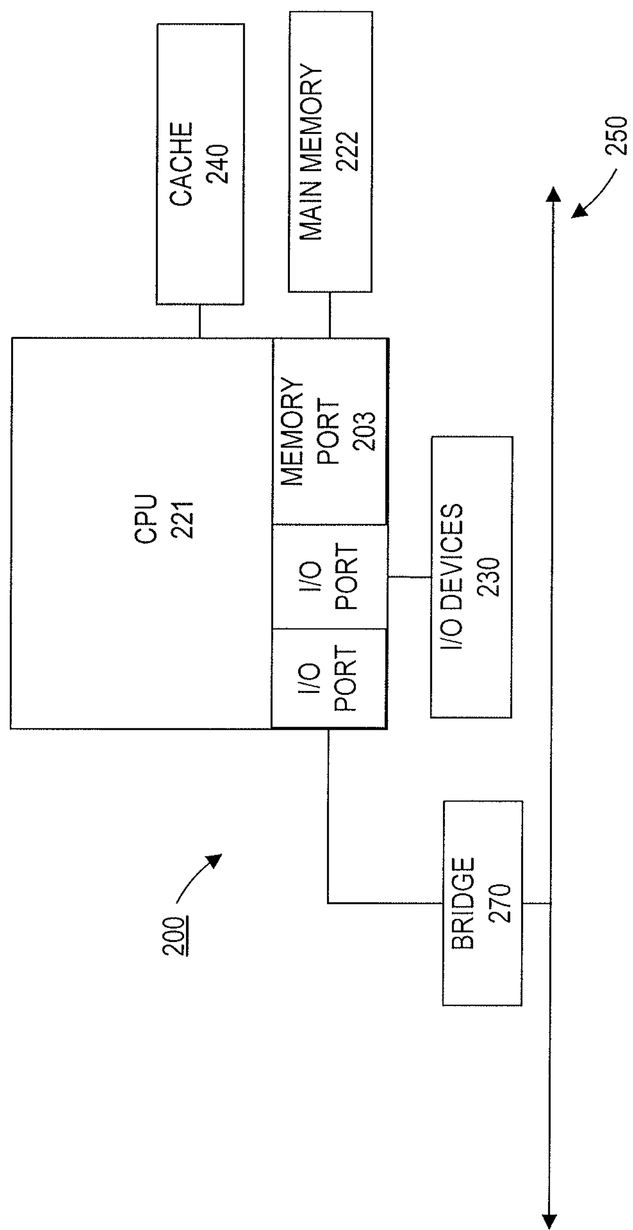

As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus (not shown), sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port (not shown). In further embodiments, I/O device 230 can be a bridge 270 between system bus 250 and an external communication bus, such as a USB bus, an Apple Desktop Bus, an RS-232 serial connection, a SCSI bus, a FireWire™ bus, a FireWire 800™ bus, an Ethernet bus, an AppleTalk™ bus, a Gigabit Ethernet bus, an Asynchronous Transfer Mode bus, a HIPPI bus, a Super HIPPI bus, a SerialPlus bus, a SCI/LAMP bus, a FibreChannel™ bus, or a Serial Attached small computer system interface bus, or some other type of data bus.

As shown in FIG. 2A, computing device 200 can support any suitable installation device 216, such as a disk drive or other input port for receiving one or more computer-readable media such as, for example, a USB device, flash drive, SD memory card; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of link including, but not limited to, standard telephone lines, LAN or WAN links (e.g., 802.11, T1, T3, 56 kb, X.25), broadband link (e.g., ISDN, Frame Relay, ATM), wireless connections (Wi-Fi, Bluetooth, Z-Wave, Zigbee), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3A:
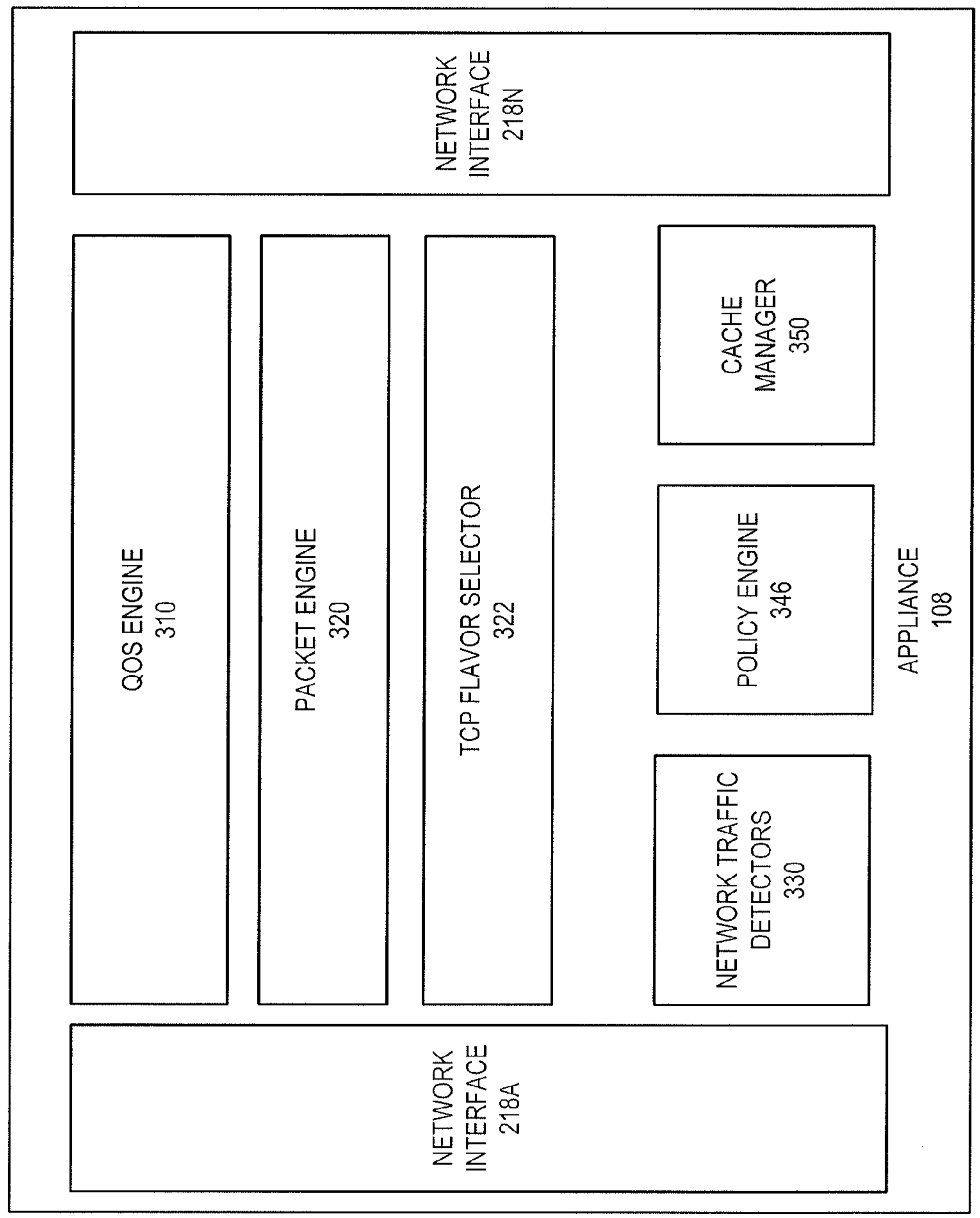
FIG. 3A is a block diagram of an exemplary appliance illustrated in FIG. 1, consistent with embodiments of the present disclosure.

FIG. 3A is a block diagram of an exemplary appliance 108 and/or 108' illustrated in FIG. 1, consistent with embodiments of the present disclosure. Appliance 108 can include one or more network interfaces 218A-N consistent with network interface 218 of FIG. 2A, a QoS engine 310, one or more packet engines 320, one or more TCP congestion avoidance flavor selectors 322 (hereafter "TCP flavor selector 322" or "flavor selector 322"), one or more network traffic detectors 330, a policy engine 346, and a cache/cache manager 350. Although FIG. 2A depicts network interfaces 218A-218N as two network interfaces, it is appreciated that interfaces 218A-218N may include any number of network interfaces.

QoS engine 310, which is also referred to as a "QoS controller," or a "QoS packet scheduler," can perform one or more optimization (e.g., Quality of Service "QoS") techniques, including the application of one or more TCP congestion avoidance algorithms ("flavors"), etc. QoS engine 310 can be one or more modules, which can be one or more packaged functional hardware units designed for use with other components or a part of a program that performs a particular function (e.g., optimization techniques), corresponding to the particular step, of related functions. QoS engine 310 can be configured to improve the performance, operation, or quality of service of any type of network traffic. QoS engine 310 can perform these techniques, for example, by using defined logic, business rules, functions, or operations. In some embodiments, QoS engine 310 performs network traffic optimization and management mechanisms that provide different priorities to different users, applications, flows, or links. QoS engine 310 can also control, maintain, or assure a certain level of performance to a user, application, flow, or connection. QoS engine 310 can direct packet engine 320 to perform any or all steps for performing a dynamic TCP flavor selection using one or more TCP characteristics. For example, QoS engine 310 can control, maintain, or assure a certain portion of bandwidth or network capacity of a communication link for a user, application, one or more flows, or links, collect data in connection with one or more flows and links, analyze the collected data, select a TCP flavor suitable for avoiding TCP traffic congestion on the one or more flows.

In some embodiments, QoS engine 310 can monitor the achieved level of performance or the quality of service (e.g., the data rate and delay) corresponding to a user, application, and/or flow, or link, and then dynamically control or adjust one or more TCP characteristics in connection with sending and receiving data packets to achieve the desired level of performance or quality of service. QoS engine 310 can direct one or more packet engines 320 to perform some or all of the steps according to exemplary embodiments disclosed herein. For example, QoS engine 310 coordinates the acquisition and delivery of TCP characteristics between TCP flavor selector 322 and packet engine 320.

Packet engines 320, which is also referred to as a "packet processing engine," a "packet processor," or a "data processor," is responsible for controlling and managing the processing of data packets received and transmitted by appliance 108 via network interfaces 218A-N. Packet engine 320 can be one or more modules, which can be one or more packaged functional hardware units designed for use with other components or a part of a program that performs a particular function (e.g., controlling and managing the processing of data packets), corresponding to the particular step, of related functions. Packet engine 320 can be embodied as a single packet engine or any number of a plurality of packet engines that can operate at the data link layer (layer 2), network layer (layer 3), or the transport layer (layer 4) of a network stack (e.g., such as the layers and protocols of the Open System Interconnection communications model). Packet engine can be configured to accomplish some or all of the steps described herein after being executed by CPU 221 and/or QoS engine 310. In some embodiments, the data packets are carried over the data link layer via the Ethernet communication protocol, which comprise any of the family of WAN or LAN protocols, such as those protocols covered by the IEEE 802.3. In some embodiments, the network stack can have any type and form of wireless protocols, such as IEEE 802.11 and/or mobile internet protocols. One or more packet engines 320 intercept or receive data packets at the network layer, such as via the IP communication protocol. In some embodiments, packet engine 320 intercepts or receives data packets at the transport layer, such as via the TCP communication protocols, and can operate at any session or any application layer above the transport layer.

Packet engine 320 can include a buffer for queuing one or more data packets during processing of the data packets. Additionally, packet engine 320 can communicate via one or more communication protocols to transmit and receive a plurality of network data packets across one or more links via network interfaces 218A-N. The links connect appliance 108 to other devices, such as, for example, appliance 108'. Packet engine 320 can be configured to acquire data regarding the flow and store, the acquired data in an operatively connected computer memory. The sent and received data packets operating across one or more links can be considered "data flows" or "flows." In some embodiments, packet engine 320 sends scheduling requests to QoS engine 310 for scheduling of data packets received and stored at packet engines 320. After packet engine 320 receives responses from QoS engine 310, packet engine 320 may process the stored data packets according to their scheduled priorities. Packet engine 320 can calculate one or more TCP characteristics of the flow based on the stored data. Flow characteristics, as discussed in further detail below, may include a plurality of information such as, for example, packet round trip times and/or the packet loss rate for a particular data flow, an average queuing delay for the packets sent and received across a particular link, and/or congestion window information, among other things.

During operations of appliance 108, packet engine 320 may be interfaced, integrated, and/or be in communication with any portion of appliance 108, such as QoS engine 310, TCP flavor selector 322, network traffic detector 330, policy engine 346, and/or cache manager 350. As such, any of the logic, functions, or operations of QoS engine 310, TCP flavor selector 322, network traffic detector 330, policy engine 346, and/or cache manager 350 can be performed in conjunction with or in responsive to packet engine 320. Packet engine 320 may be controlled by and/or executed by CPU 221 to perform any operation described herein, either directly, via policy engine 346, or another operatively configured module.

One or more TCP congestion avoidance flavor selectors 322 may be configured to send and receive flow information from packet engine 320, and/or QoS engine 310. TCP flavor selector 322 may be configured to acquire one or more TCP characteristics from packet engine 320 and select a TCP flavor based on the TCP characteristics. TCP flavor selector 322 can be one or more modules, which can be one or more packaged functional software and/or hardware units designed for use with other components or a part of a program that performs a particular function (e.g., acquire one or more TCP characteristics from packet engine 320 and select a TCP flavor based on the TCP characteristics), corresponding to the particular step, of related functions.

Because the TCP characteristics change with time, and may change in real time during the TCP flavor selection process, the selection is said to be "dynamic." Flow characteristics may include characteristics that change with time, such as, for example, packet round trip times and/or the packet loss rate for a particular data flow, an average queuing delay for the packets sent and received across a particular link, and/or congestion window information.

Dynamic selection of a TCP flavor may include acquiring and/or receiving one or more TCP characteristics containing information regarding the flow operating across an operatively connected TCP link, selecting a TCP flavor dynamically (without interrupting the TCP data flow), and applying the TCP flavor to the data flow (without interrupting the TCP data flow). The information acquired and/or received by TCP flavor selector 322 may also include "static" input regarding the link itself, such as, for example, the link type (dedicated link, broadband link, etc.) and/or the link bandwidth. According to some embodiments, link type and bandwidth are "static" because they do not (usually) change with time. In some embodiments, both static information and dynamic information are input into TCP flavor selector 322. TCP flavor selector 322 may select one or more TCP flavors based on both of the static and dynamic inputs.

One or more network traffic detectors 330 can include any logic, business rules, functions, or operations for automatically detecting the type of network traffic corresponding to data packets acquired by packet engines 320. As described above, packet engine 320 send, receive and store data packets from any type of network traffic, such as data packets from any communication protocols including WAN, MAN, LAN, and wireless communication protocols. In some embodiments, not all network traffic is optimized by QoS engine 310. For example, QoS engine 310 can be used to optimize the WAN traffic, but not the LAN traffic or traffic directed to management. Network traffic detectors 330 can detect the type of network traffic received at packet engines 320 by any available techniques, such as by using IP addresses. Network traffic detectors 330 can also determine a link type, a bandwidth, and/or other characteristics associated with one or more flows. Traffic detector 330 can be one or more modules, which can be one or more packaged functional hardware units designed for use with other components or a part of a program that performs a particular function (e.g., acquire one or more TCP characteristics from packet engine 320 and select a TCP flavor based on the TCP characteristics), corresponding to the particular step, of related functions.

Figure 3B:
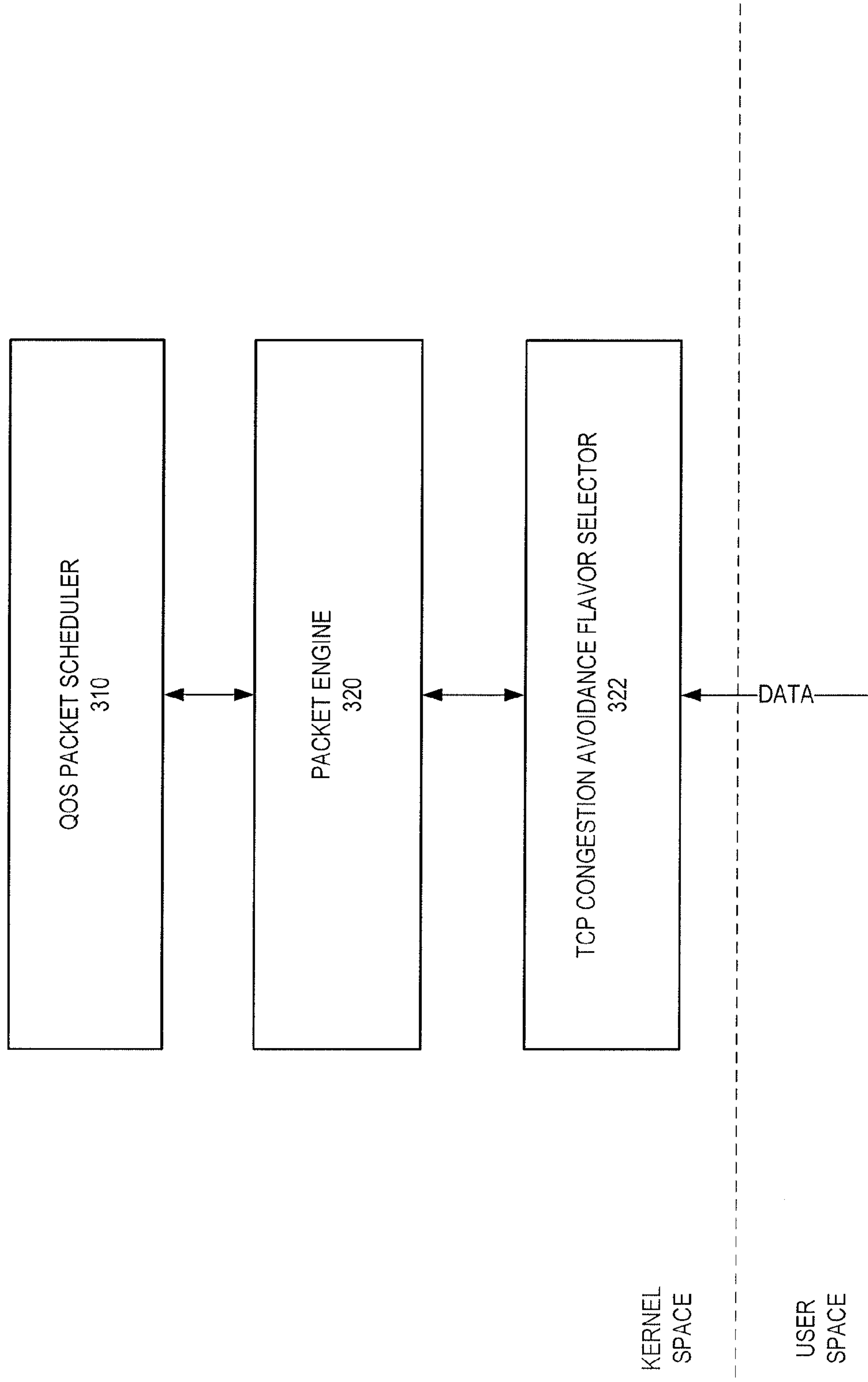
FIG. 3B is a block diagram of a portion of an exemplary appliance illustrated in FIG. 3A, consistent with embodiments of the present disclosure.

Appliance 108 can also include a policy engine 346, also referred to as a policy controller or a policy provider. Policy engine 346 can include any logic, function, or operations for providing and applying one or more policies or rules to the function, operation, or configuration of any portion of the appliance 108. In some embodiments, policy engine 346 provides a configuration mechanism to allow a user to identify, specify, define, or configure a policy for appliance 108, or any portion thereof. For example, policy engine 346 can provide a predefined traffic optimization configuration policy including the number of priorities, the priorities associated with each service class, the number of connections allowed under each service class, link bandwidth configuration, and any other policy information. Policy engine 346 can also provide policies for what data to cache, when to cache the data, for whom to cache the data, when to expire an object in cache, or when to refresh the cache. Policy engine 346 can also include any logic, rules, functions, or operations for determining and providing access, control, and management of data packets received and stored by packet engine 320. Policy engine 346 can also include any logic, rules, functions, or operations for determining and providing access, control and management of security, network traffic, network access, compression, or any other function or operation performed by appliance 108. Policy engine 346 can be one or more modules, which can be one or more packaged functional hardware units designed for use with other components or a part of a program that performs a particular function (e.g., provide information in connection with an active link), corresponding to the particular step, of related functions Cache manager 350 can include software, hardware, or any combination of software and hardware to store data, information, and objects to a cache in memory or storage; to provide cache access; and to control and manage the cache. The data, objects, or content processed and stored by cache manager 350 can include data in any format, such as a six-byte MAC address, a TCP data packet, or any type of data communicated via any communication protocol. Examples of types of data may include, for example, one or more TCP characteristics including information in connection with packet loss rates, queuing delays, flow congestion, sizes of congestion windows, bandwidth of one or more links, average round trip times, etc. Cache manager 350 can duplicate original data stored in a slow-access storage and store the data in a fast-access cache memory, such as cache 240. After the data is stored in the cache, future use can be made by accessing the cached copy rather than refetching or recomputing the original data, thereby reducing the access time. In some embodiments, the cache can comprise a data object in memory of the appliance 108. In some embodiments, the cache can comprise any type and form of storage element of the appliance 108, such as a portion of a hard disk. In some embodiments, as described above, the processing unit of the device, such as CPU 221, can provide cache memory for use by cache manager 350. Cache manager 350 can use any portion and combination of main memory 222, storage 228, or CPU 221 for caching data, objects, and other content. Cache manager 350 can comprise any type of general purpose processor (GPP), or any other type of integrated circuit, such as a Field Programmable Gate Array (FPGA), Programmable Logic Device (PLD), or Application Specific Integrated Circuit (ASIC). Cache manager 350 can be one or more modules, which can be one or more packaged functional hardware units designed for use with other components or a part of a program that performs a particular function, corresponding to the particular step, of related functions FIG. 3B is a block diagram of a portion of exemplary appliance 108 illustrated in FIG. 3A, consistent with embodiments of the present disclosure. In some embodiments, the operating system of appliance 108 allocates, manages, or otherwise segregates the available system memory into what is referred to as kernel space (system space) and user space (application space). The kernel space is typically reserved for running the kernel, including any device drivers, kernel extensions, or other kernel related software. The kernel can be the core of the operating system, and provides access, control, and management of resources and hardware-related elements of the appliance 108. In accordance with some embodiments of the appliance 108, the kernel space can also include a number of network services or processes working in conjunction with QoS engine 310, packet engine 320, TCP flavor selector 322, or any portion thereof. Additionally, the embodiments of the kernel can depend on the operating system installed, configured, or otherwise used by appliance 108.

User space is the memory area or portion of the operating system used by user mode applications or programs otherwise running in user mode. A user mode application cannot access kernel space directly and uses service calls to access kernel services. The operating system uses the user space for executing or running applications and provisioning of user level programs, services, processes, and/or tasks. As an example, the operating system can execute software of network interfaces 218A-N in the user space.

Figure 4:
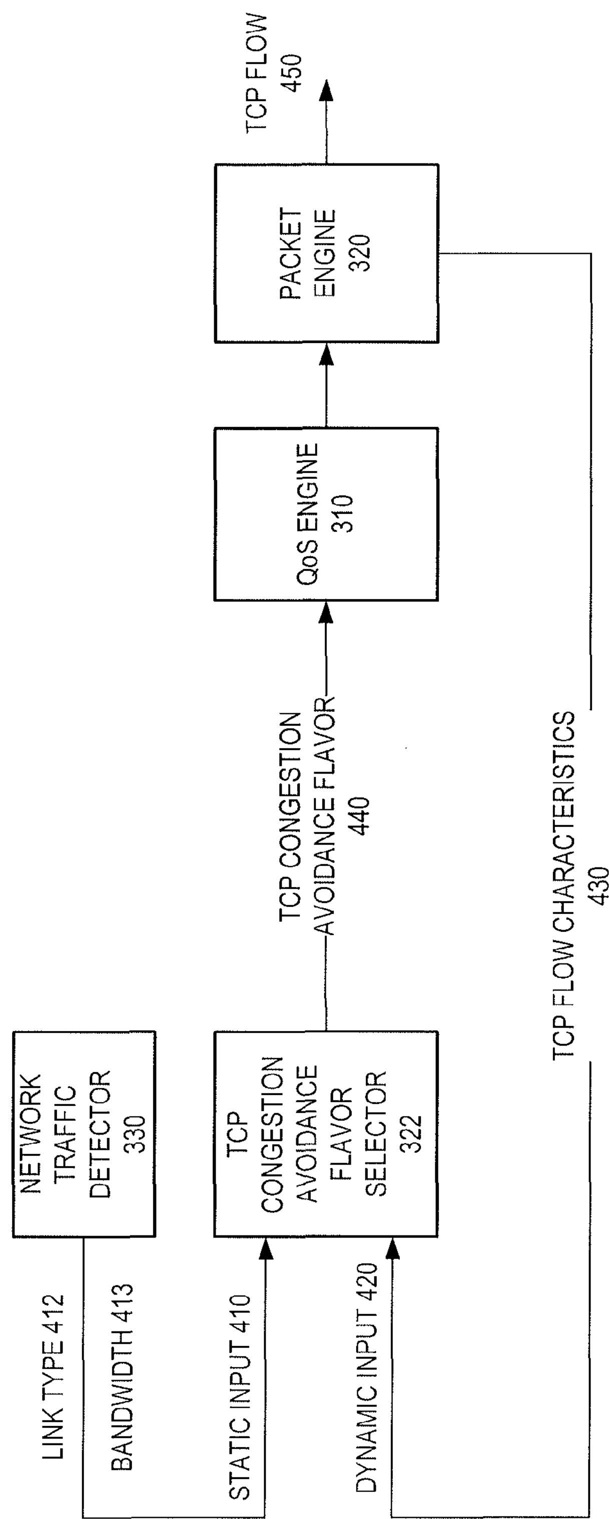
FIG. 4 is a block diagram of an exemplary embodiment for selecting a TCP congestion avoidance flavor, consistent with embodiments of the present disclosure.

FIG. 4 is a block diagram of an exemplary embodiment for selecting a TCP congestion avoidance flavor 440, consistent with embodiments of the present disclosure. As described above, TCP flavor selector 322 can be configured to receive both static input 410 and dynamic input 420. Static input 410 can include one or more TCP characteristics 430 that can include information in connection with an active flow 450. TCP characteristics 430 can include information including one or more packet loss rates, one or more queuing delays, information indicative of flow congestion, information indicative of one or more congestion window sizes, a bandwidth of one or more links, and information indicative of one or more average round trip times for packets in an active flow 450. A flow is "active" when packets are being sent and received across a TCP link.

According to some embodiments, one or more processors (e.g., CPU 221) execute TCP flavor selector 322. TCP flavor selector 322 may then receive dynamic input 420, static input 410, or both, and select a TCP flavor 440 based on the static input 410 and/or dynamic input 420. For example, TCP flavor selector can acquire one or more TCP characteristics 430 from packet engine 320, acquire link information 412 from network traffic detector 330, and select a TCP congestion avoidance flavor 440 that is used by QoS engine 310 to modify flow 450 using TCP flavor 440. TCP characteristics 430 can constantly change with respect to time, because average round trip times, packet loss rates, queuing delays, and/or other aspects of flow 450 may vary over an interval of time with traffic congestion. Packet engine 320 may receive the modified flow 450, continually monitor the traffic for a predetermined period of time, and provide dynamic feedback to TCP flavor selector 322. Although a predetermined period of time may vary based on application, it is contemplated that packet engine 320 can monitor traffic for periods of several seconds to periods of time spanning several minutes before calculating TCP characteristics 430.

Figure 5:
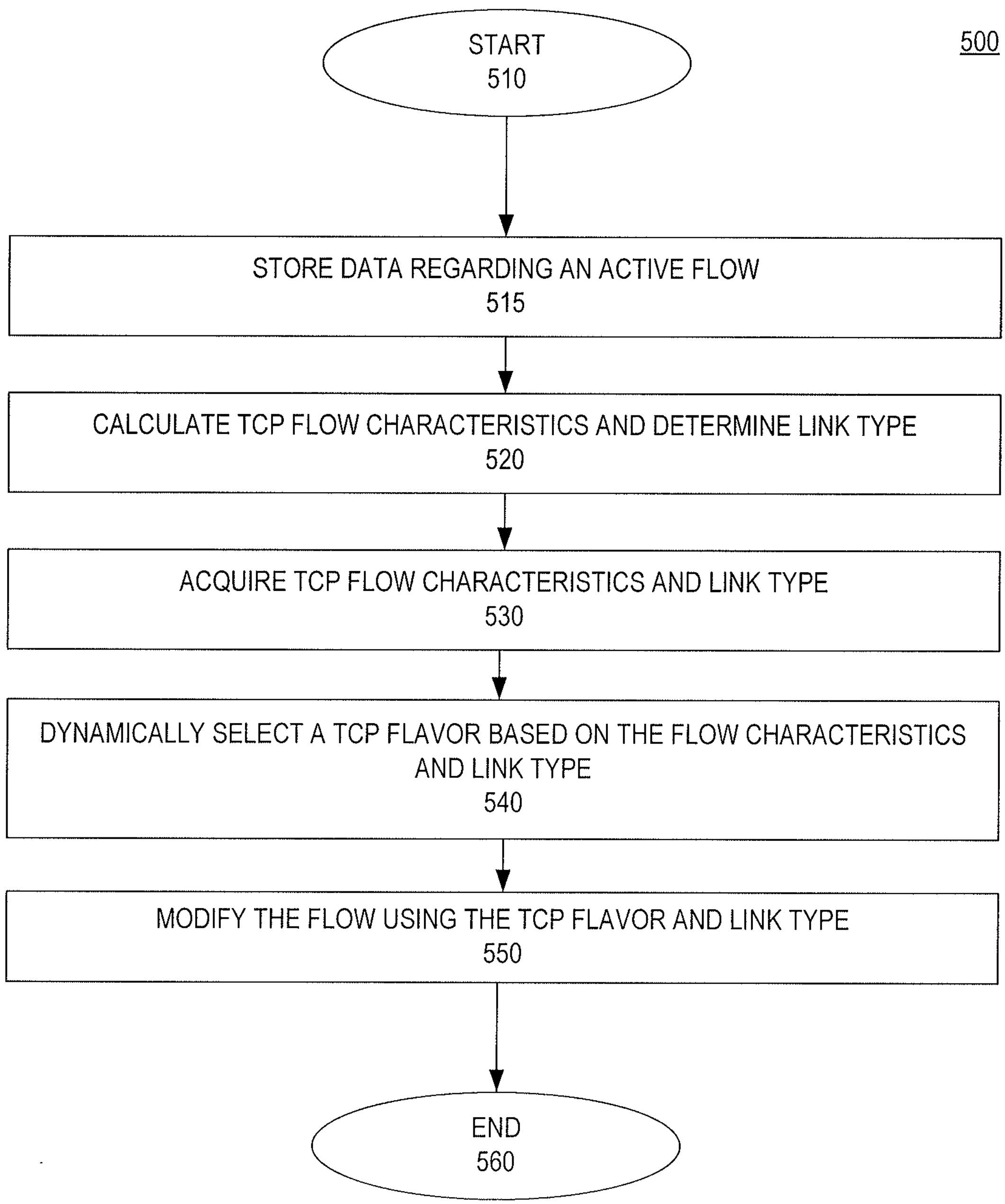
FIG. 5 is a flowchart representing an exemplary method of modifying a flow, consistent with embodiments of the present disclosure.

FIG. 5 is a flowchart representing an exemplary method 500 of modifying a flow, consistent with embodiments of the present disclosure. It will be readily appreciated that the illustrated procedure can be altered to delete steps or further include additional steps. While method 500 is described as being performed by an appliance (e.g., appliance 108), it is appreciated that method 500 can be performed by other devices alone or in combination with the appliance.

After an initial start step 510, appliance 108, using for example one or more packet engines (e.g., packet engine 320), can send and receive a plurality of data packets comprising an active flow that operates across a link. At step 515, appliance 108 can execute instructions that cause packet engine 320 to acquire and store data regarding the active flow, and store the data to an operatively connected computer-readable memory. In some embodiments, appliance 108 (via packet engine 320) may direct cache manager 350 to perform the active flow data storage.

The data regarding the TCP characteristics includes information indicative of the operation of the active flow. For example, flow data can include information indicative of queuing times of packets, packet send times, packet receive times, round trip times for both sending and receiving the same packet (or an acknowledgement thereof), information indicative of the number of packets lost during a predetermined period of time, a total number of packets sent and received, and/or other information indicative of the congestion and/or operational aspects of one or more active flows operating across a link.

Figure 6:
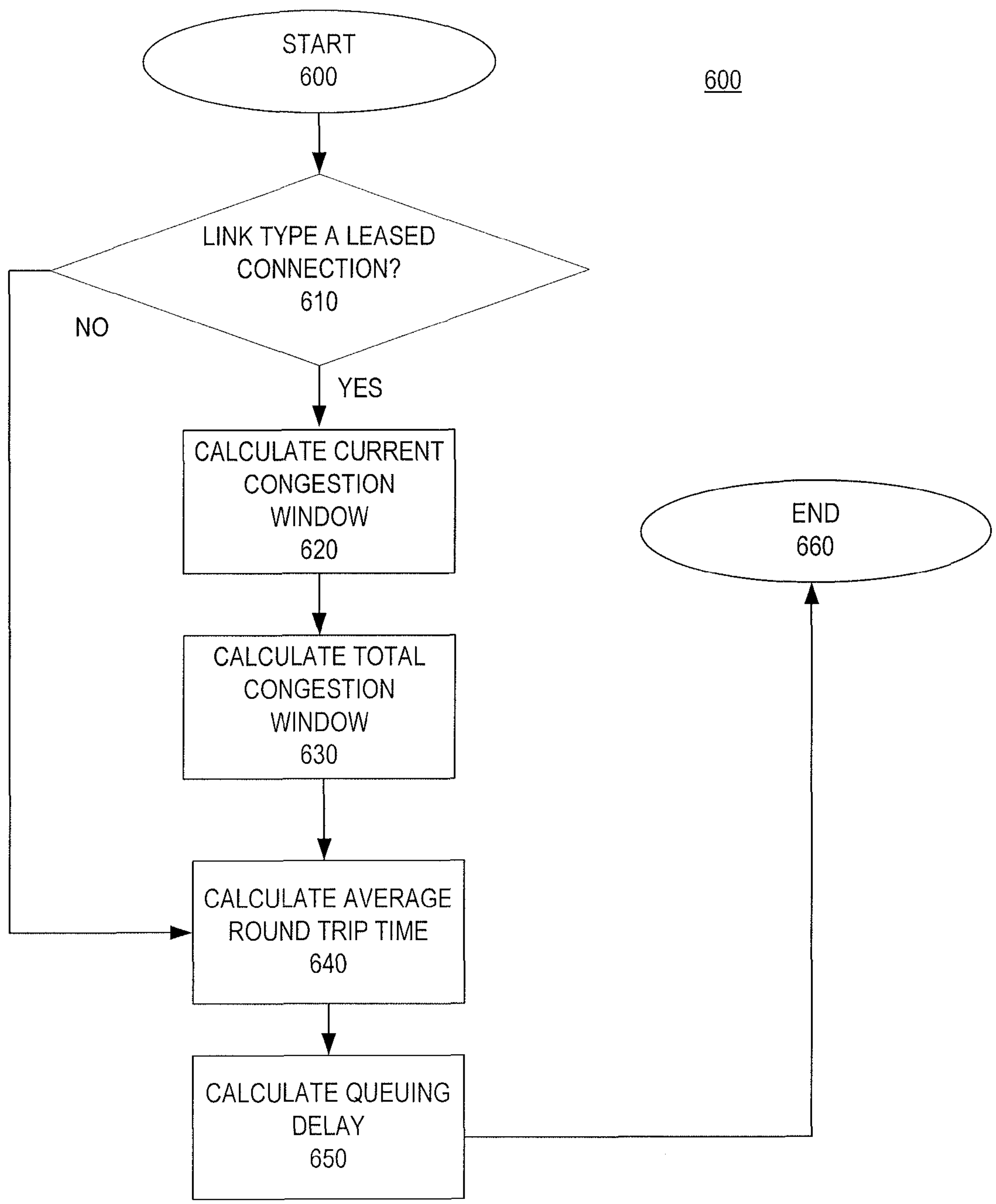
FIG. 6 is a flowchart representing an exemplary method of calculating TCP characteristics, consistent with embodiments of the present disclosure.

After appliance 108 acquires and stores data regarding the active flow, it can calculate TCP characteristics. FIG. 6 considers an exemplary calculation of TCP characteristics.

Referring now to FIG. 6, an exemplary method of determining TCP characteristics is described, consistent with embodiments of the present disclosure. After an initial starting step 600, appliance 108, via one or more operatively configured modules, determines information about the link type, determines information about the flow, and determines a plurality of aspects of the TCP traffic. For example, at step 610, packet engine 320 can determine the static characteristics such as link type 412 and link bandwidth 413.

At steps 620-640, appliance 108 determines TCP characteristics (e.g., TCP characteristics 430) by analyzing a plurality of aspects in connection with a particular flow. For example, at step 620, appliance 108 can determine a current congestion window ("$cwnd_{current\_n}$") for each active flow. A current congestion window gives the current congestion window sizes for each of the active TCP flows. Appliance 108 then calculates the current congestion window for each current congestion window in the flow (e.g., $cwnd_{current\_1}$, $cwnd_{current\_2}$, . . . $cwnd_{current\_n}$).

At step 630, appliance 108 determines a total congestion window ("$cwnd_{total}$"), where $$cwnd_{total}=cwnd_{current\_1}+cwnd_{current\_2}+ \ldots cwnd_{current\_n}.$$

The total congestion window provides an approximate value for the total number of packets occupying the link at any given time. While the determination of a total congestion window can involve a calculation (as shown above), it is appreciated that the determination can involve other mechanisms, such as using a look-up table. The total congestion window calculation is available for a leased line link, because for other link types (e.g., broadband), the channel can be shared, and thus, TCP connections for other networks are also present. According to some embodiments, if appliance 108 evaluates at step 610 that the link type is not a leased line link, appliance 108 determines round trip time (step 640) and queuing delay (step 650) without considering congestion window sizes.

At step 640, appliance 108 evaluates an average round trip time for the plurality of packets recently sent and received by packet engine 320 across a particular link. A first step in determining average round trip time for a given interval of time is determining an average bandwidth delay product ($BDP_{avg}$) for the plurality of data packets. $BDP_{avg}$ is determined by $$BDP_{avg}=B*RTT_{avg},$$

where B is a bandwidth of the link (e.g., bandwidth 413), and $RTT_{avg}$ is the average round trip time for the plurality of data packets operating across the link during the time interval. While the determination of the average bandwidth delay product can involve a calculation (as shown above), it is appreciated that the determination can involve other mechanisms, such as using a look-up table based on inputs B and $RTT_{avg}$.

According to some embodiments, at step 650, appliance 108 may also determine a queuing delay ($d_q$) for the packets sent and received by packet engine 320 for flow 450. A value for $d_q$ is calculated by:

$$d_q=RTT_{current}-RTT_{low} \text{ for } d_q>0,$$

where $RTT_{current}$ is the round trip time currently experienced for a particular flow, and $RTT_{low}$ is the shortest round trip time experienced by the plurality of packets sent and received by packet engine 320 during the predetermined time interval. Appliance 108 calculates values for $d_q$ for each of a plurality of active flows. According to some embodiments, packet engine also calculates an average queuing delay ($d_{q\_avg}$), which is an average for all of the active flows operating across each respective TCP link. While the determination of the queuing delay can involve a calculation (as shown above), it is appreciated that the determination can involve other mechanisms, such as using a look-up table using $RTT_{current}$ and $RTT_{low}$.

According to some embodiments, appliance 108 determines a rate of packet loss for flow 450. A calculation of the rate of packet loss (or some other determination mechanism) can be indicative of the rate of information loss through a particular link during the predetermined time interval. For an active link, $$\text{packet loss rate}=(\text{number of data packets lost}*100)/\text{total packets sent}.$$

Accordingly, appliance 108 directs packet engine 320 to calculate flow characteristic 430, which includes calculated values for packet loss rate, $RTT_{avg}$, $d_q$, $d_{q\_avg}$, $cwnd_{total}$, and $BDP_{avg}$. Method 600 completes at end step 660.

Referring again to FIG. 5, after appliance 108 causes packet engine 320 to determine TCP characteristics, appliance 108 causes TCP flavor selector 322 to acquire TCP characteristics 430 from packet engine 320 (step 530). Although TCP flavor selector 322 is said to acquire the TCP characteristic, it is contemplated that packet engine 320 also provides TCP characteristics 430 in response to a request, and/or at some other time. For example and as previously discussed, TCP characteristics 430 dynamically change with respect to time. According to some embodiments, appliance 108 acquires the flow data saved over a predetermined time interval (e.g., 10 seconds, 10 minute, 30 minutes, etc.), and continually calculates TCP characteristics 430 at each predetermined interval. Alternatively, packet engine 320 provides TCP characteristics 430 to TCP flavor selector 322 at predetermined intervals.

According to some embodiments, appliance 107 can acquire other information indicative of the link type (e.g., link type 412) across which the active flows are operating (step 530). In contrast with dynamic input 420, static input (e.g., link type 412 and bandwidth 413) does not change with time. A link type can be, for example, a broadband link, a dedicated leased-line link between two dedicated appliances (e.g., 180 and 180'), and/or other types of links across which flow 450 operates. Link type 412 can also include information indicative of the link characteristics, such as bandwidth information. It is contemplated that appliance 108 can acquire link type 412 via other modules, such as, for example, network traffic detector 330. At step 540, appliance 108 dynamically selects a TCP flavor from a plurality of TCP flavors based on the flow characteristics 430 and link type 412. TCP flavor selector 322 may provide a selected TCP congestion avoidance flavor (e.g., TCP congestion avoidance flavor 440) to a QoS engine (e.g., QoS engine 310) in real-time based on both static and dynamic characteristics of the currently traffic and the connection.

At step 550, appliance 108 can cause QoS engine 310 to modify the flow using, among other things, the selected TCP flavor 440 and link type. According to some embodiments, at step 550 QoS engine 310 optimizes apparatus 108 by modifying the flow. According to other exemplary embodiments, appliance 108 modifies more than one active flow using a plurality of dynamically selected TCP flavors, where each of the selected TCP flavors are based on the dynamically changing flow characteristics respective to each flow. The plurality of modified flows can be operating across one or multiple links.

From the implementation point of view, since some embodiments are configured to dynamically change the TCP flavor for all the active connections on the fly (e.g., in real time without interrupting the TCP flows), appliance 108 can be configured to simultaneously run a predetermined number of TCP flavors of TCP congestion avoidance algorithms in the background. In some aspects, a simple software switch can select and apply the optimal TCP congestion avoidance flavor for any active flow on the fly. For example, appliance 108 can be configured to feed the input to the TCP implementation for the optimal flavor. Embodiments described herein describe some exemplary ways to switch across different TCP flavors. It is appreciated that other methods for TCP flavor software switching are possible.

FIG. 7 depicts an exemplary configuration of appliance 108 consistent with embodiments of the present disclosure. Appliance 108 can be configured to consider operational aspects of each TCP link via the static and dynamic characteristics for each link. For example, packet engine 320 can determine whether the total congestion window ($cwnd_{total}$) is greater than the average bandwidth delay product ($BDP_{avg}$), and select a TCP flavor based, at least in part, on the comparison. Accordingly, appliance 108 may cause flavor selector 322 to output a TCP flavor 440 for each of a plurality of link types (e.g., link type 412) based on the operational aspects of the TCP links.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A first WAN appliance for optimizing network traffic, comprising:

a packet engine configured to acquire data regarding a flow of a plurality of data packets of a plurality of active data-packet flows over a link between the first WAN appliance and a second WAN appliance and to determine transport communication protocol (TCP) characteristics for the flow;

a TCP traffic detector configured to determine a link type of the link between the first WAN appliance and the second WAN appliance, and responsive to determining that the link type is a leased line connection, determine a current congestion window in the flow; and a TCP flavor selector configured to dynamically select a TCP flavor for the flow based on the TCP characteristics of the flow, the link type, and the current congestion window, wherein the TCP flavor can be used to modify the flow of data packets over the link.

2. The first WAN appliance of claim 1, wherein the TCP flavor selector is further configured to modify the flow using the TCP flavor.

3. The first WAN appliance of claim 2, wherein the TCP characteristics dynamically change with time.

4. The first WAN appliance of claim 1, wherein the TCP flavor selector is configured to modify the plurality of active flows using one or more TCP flavors based on a dynamically changing flow characteristic respective to each flow.

5. The first WAN appliance of claim 1, wherein the TCP characteristics comprise:

an average round trip time for plurality of data packets sent and received via the flow;

a packet loss rate; and an average queuing delay.

6. The first WAN appliance of claim 4, wherein the packet engine is further configured to:

determine a size of every active congestion window corresponding to the active data-packet flows on the link;

evaluate a sum of the active congestion windows; and evaluate a total congestion window using the sum of the active congestion windows.

7. The first WAN appliance of claim 1, wherein the packet engine is configured to:

collect data for the flow for a predetermined period of time, wherein the collected data is indicative of a round trip for each of the packets in the plurality of packets; and evaluate the average round trip time based on the collected data.

8. The first WAN appliance of claim 7, wherein the packet engine is configured to determine an average bandwidth delay product for the plurality of data packets using a bandwidth of the link and the average round trip time for the plurality of data packets.

9. A method for optimizing network traffic over a link between a first WAN appliance and a second WAN appliance, the method performed by the first WAN appliance and comprising:

acquiring data regarding a flow of a plurality of data packets of a number of active data packet flows over the link;

determining TCP characteristics for the flow;

determining that a link type of the link is a leased line connection;

determining a current congestion window in the flow based on the link type being a leased line connection; and selecting a TCP flavor based on the TCP characteristics of the flow, the link type, and the current congestion window, wherein the TCP flavor can be used to modify the flow of data packets over the link.

10. The method of claim 9, further comprising modifying the flow using the TCP flavor.

11. The method of claim 10, wherein the TCP characteristics dynamically change with time.

12. The method of claim 9, wherein the TCP characteristics comprise:

an average round trip time for a plurality of data packets sent and received via the flow;

a packet loss rate; and an average queuing delay.

13. The method of claim 9, further comprising:

determining a size of every active congestion window corresponding to the active data-packet flows on the link;

evaluating a sum of the active congestion windows; and evaluating a total congestion window using the sum of the active congestion windows.

14. The method of claim 9, further comprising:

collecting data for the flow for a predetermined period of time, wherein the collected data is indicative of a round trip for each of the packets in the plurality of packets; and evaluating the average round trip time based on the collected data.

15. The method of claim 14, comprising:

determining an average bandwidth delay product for the plurality of data packets using a bandwidth of the link and the average round trip time for the plurality of data packets.

16. A non-transitory computer readable storage medium that stores a set of instructions that is executable by at least one processor of first WAN appliance to cause the first WAN appliance to perform a method for optimizing network traffic over a link between the first WAN appliance and a second WAN appliance, the method comprising:

determining TCP characteristics for the flow;

determining that a link type of the link is a leased line connection;

determining a current congestion window in the flow based on the link type being a leased line connection; and selecting a TCP flavor based on the TCP characteristics of the flow, the link type, and the current congestion window, wherein the TCP flavor can be used to modify the flow of data packets over the link.

17. The non-transitory computer readable storage medium of claim 16, wherein the set of instructions that is executable by the at least one processor of the first WAN appliance to cause the first WAN appliance to further perform:

modifying the flow using the TCP flavor.

18. The non-transitory computer readable storage medium of claim 17, wherein the TCP characteristics dynamically change with time.

19. The non-transitory computer readable storage medium of claim 16, wherein the TCP characteristics comprise:

an average round trip time for a plurality of data packets sent and received via the flow;

a packet loss rate; and an average queuing delay.

20. The non-transitory computer readable storage medium of claim 16, wherein the set of instructions that is executable by the at least one processor of the first WAN appliance to cause the first WAN appliance to further perform:

determining a size of every active congestion window corresponding to the active data-packet flows on the link;

evaluating a sum of the active congestion windows in the flow; and evaluating a total congestion window using the sum of the active congestion windows.

21. The non-transitory computer readable storage medium of claim 16, wherein the set of instructions that is executable by the at least one processor of the first WAN appliance to cause the first WAN appliance to further perform:

collecting data for the flow for a predetermined period of time, wherein the data is indicative of a round trip for each of the packets in the plurality of packets; and evaluating the average round trip time based on the collected data.

22. The non-transitory computer readable storage medium of claim 21, wherein the set of instructions that is executable by the at least one processor of the first WAN appliance to cause the first WAN appliance to further perform:

determining an average bandwidth delay product for the plurality of data packets using a bandwidth of the link and the average round trip time for the plurality of data packets.

23. A non-transitory computer readable storage medium that stores a set of instructions that is executable by at least one processor of an appliance to cause the appliance to perform a method for optimizing network traffic over a link, the method comprising:

acquiring data regarding a flow of a plurality of data packets of a number of active data packet flows over the link;

receiving TCP characteristics for the flow;

determining that a link type of the link is a leased line connection;

determining a current congestion window in the flow based on the link type being a leased line connection; and selecting a TCP flavor based on the TCP characteristics of the flow, the link type, and the current congestion window, wherein the TCP flavor can be used to modify the flow of data packets over the link.

* * * * *